(12) United States Patent
Chen

(10) Patent No.: US 7,930,005 B2
(45) Date of Patent: Apr. 19, 2011

(54) HOUSING AND PORTABLE ELECTRONIC DEVICE USING SAME

(75) Inventor: Meng-Chun Chen, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 598 days.

(21) Appl. No.: 11/967,050

(22) Filed: Dec. 29, 2007

(65) Prior Publication Data
US 2009/0143115 A1 Jun. 4, 2009

(30) Foreign Application Priority Data
Dec. 3, 2007 (CN) .......................... 2007 1 0202830

(51) Int. Cl.
*H04M 1/00* (2006.01)
*H04B 1/38* (2006.01)

(52) U.S. Cl. .................. 455/575.1; 455/550.1; 455/90.3

(58) Field of Classification Search ............... 455/550.1, 455/575.1, 90.3
See application file for complete search history.

(56) References Cited

U.S. PATENT DOCUMENTS
2007/0049326 A1* 3/2007 Kim .......................... 455/550.1
* cited by examiner

*Primary Examiner* — Tilahun Gesesse
(74) *Attorney, Agent, or Firm* — Jeffrey T. Knapp

(57) ABSTRACT

A portable electronic device (100) includes a body (10) and a housing (30). The body has a speaker (20) and a groove (13). The speaker is received in the groove. The housing defines at least one main hole (34) and two subsidiary holes (35). The subsidiary holes is disposed adjacent to the at least one main hole.

3 Claims, 2 Drawing Sheets

HOUSING AND PORTABLE ELECTRONIC DEVICE USING SAME

BACKGROUND OF THE INVENTION

1. Field of the Invention

The present invention generally relates to housings, particularly to a housing configured for broadcasting sound for a portable electronic devices such as mobile phones, personal digital assistant (PDA), and so on.

2. Discussion of the Related Art

With the development of wireless communication and information processing technologies, portable electronic devices such as mobile phones and PDAs are now in widespread use, and consumers may now enjoy the full convenience of high technology products almost anytime and anywhere. In order to satisfy consumer different tastes, more and more portable electronic devices are provided with various audio-visual functions such as playing music or video. Accordingly, such device requires a high quality sound effect.

A conventional portable electronic device includes a body and a housing attached thereto. A speaker is disposed in the body. The housing defines an opening therein. The opening corresponds to the speaker in the body. A sound channel is formed between the body and the housing, and is in communication with the opening. After the speaker generates sound, the sound is transmitted through the sound channel to the opening and broadcasted to an outside of the portable electronic device.

However, in use, ear of the user needs to be aligned with the opening of the portable electronic device in order to clearly receive the sound from the speaker. If ear of the user is offset from the opening of the portable electronic device, the sound from the speaker cannot be clearly heard. This will greatly affect the use quality of the mobile phone.

Therefore, an improve housing is desired in order to overcome the above-described shortcoming.

SUMMARY

One embodiment of a portable electronic device includes a body and a housing. The body includes a speaker and a groove. The speaker is received in the groove. The housing defines at least one main hole and two subsidiary holes. The subsidiary holes are disposed adjacent to at least one main hole.

Other advantages and novel features of the present housing will become more apparent from the following detailed description when taken in conjunction with the accompanying drawings.

BRIEF DESCRIPTION OF THE DRAWING

The components in the drawings are not necessarily drawn to scale, the emphasis instead being placed upon clearly illustrating the principles of the present housing. Moreover, in the drawings, like reference numerals designate corresponding parts, in which.

DETAILED DESCRIPTION OF THE EMBODIMENT

Figure 1:
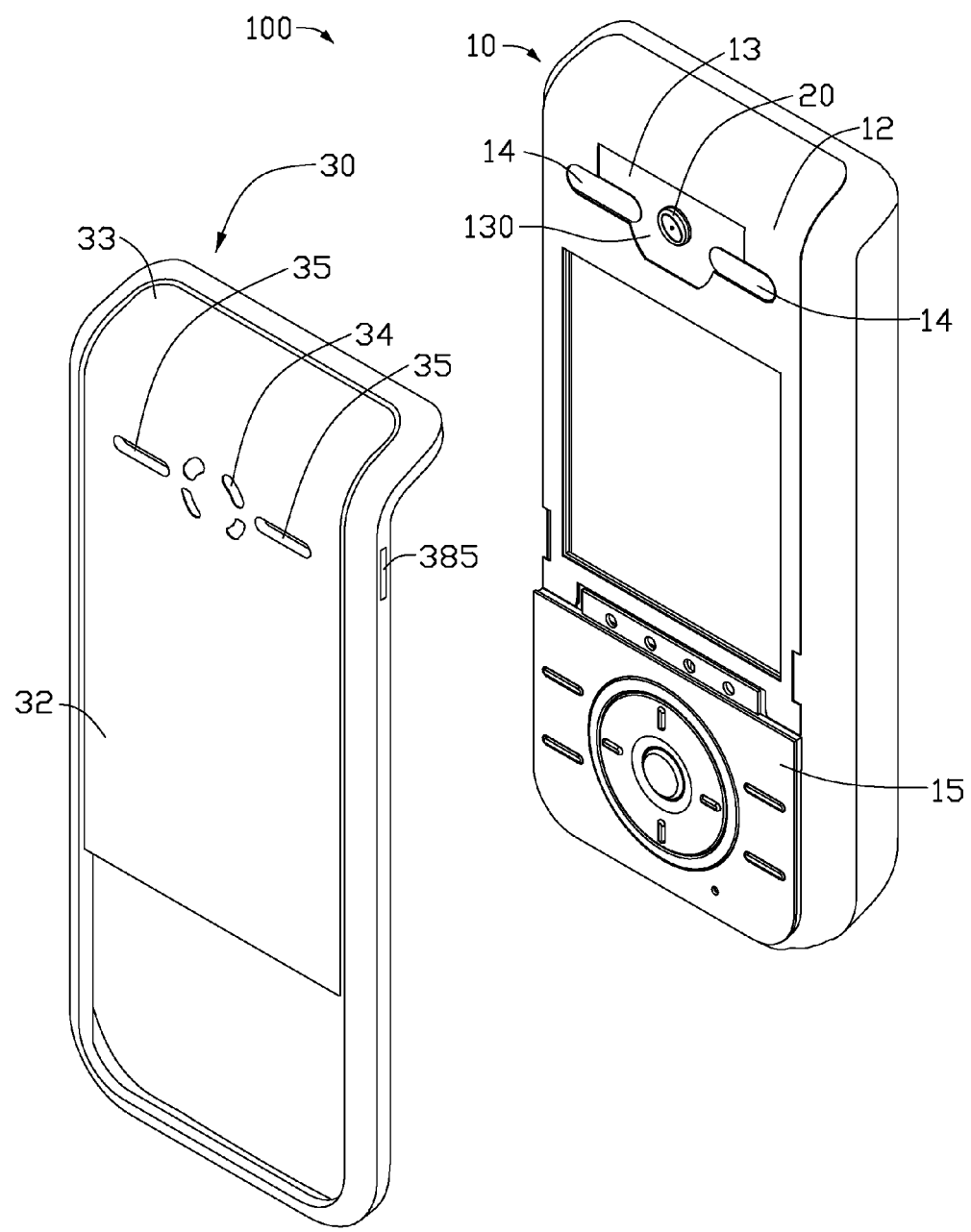
FIG. 1 is an exploded, isometric view of one embodiment of the portable electronic device with a housing.

Referring now to the drawings in detail, FIG. 1 shows a housing applied in a portable electronic device such as a mobile phone in accordance with one embodiment of the present invention. In an exemplary application, the housing is incorporated in a mobile phone 100.

The mobile phone 100 includes a body 10 and a housing 30 attached thereto. The body 10 is substantially rectangular shaped, and includes an end portion 12 and a keypad area 15. The end portion 12 has a bottom surface 130 and a recess 13. The recess 13 is defined in a middle section of the end portion 12. A speaker 20 is received in the recess 13, and is fixed in the bottom surface 130. The end portion 12 defines two grooves 14, which are respectively disposed at two sides of the speaker 20. The two grooves 14 align with each other horizontally, and are intersected with the recess 13. The keypad area 15 is located at the opposite end to the end portion 12 of the body 10.

Figure 2:
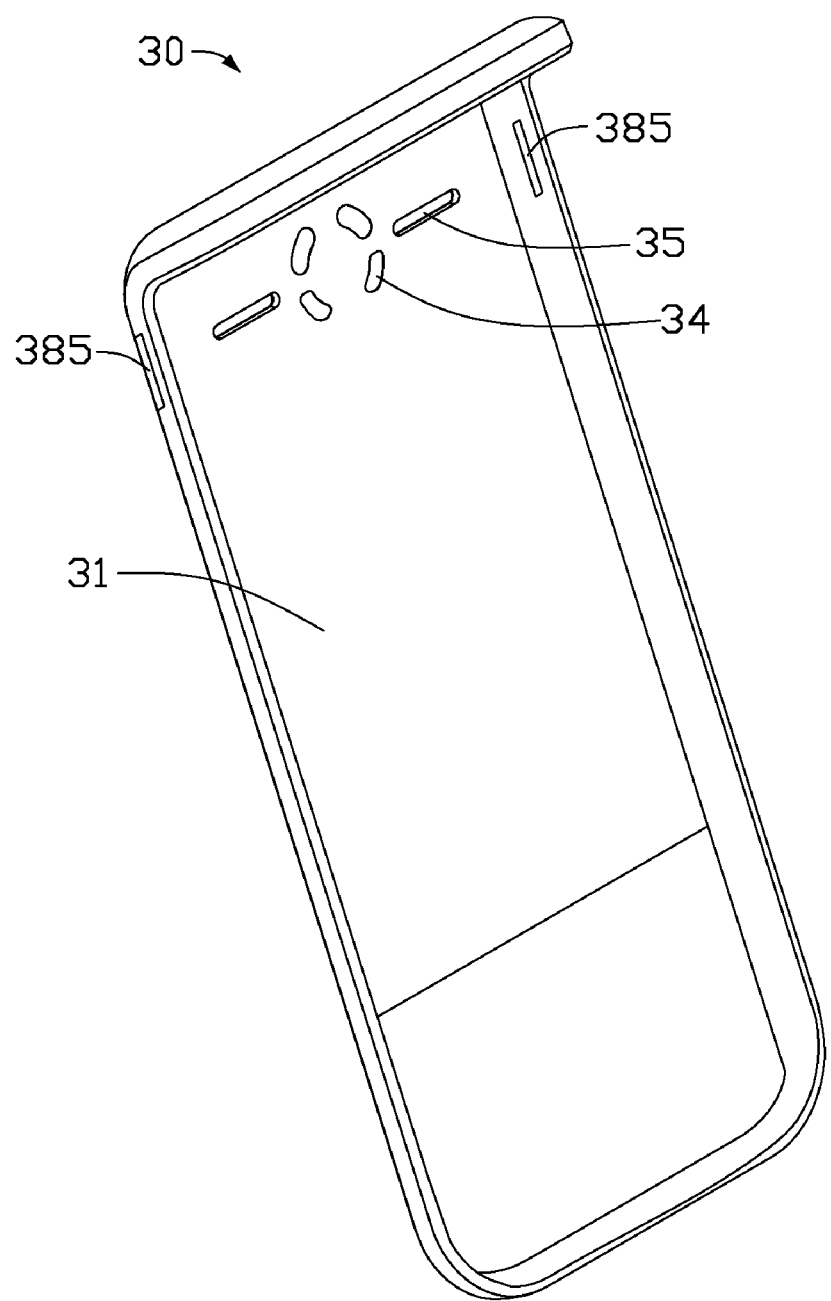
FIG. 2 is an isometric view of the housing in FIG. 1.

Referring also to FIG. 2, the housing 30 is substantially L-shape, and includes a main section 32 and an arcuate section 33. The arcuate section 33 is interconnected with the main section 32 at an angle.

The main section 32 includes a main hole 34 and two subsidiary holes 35. The main hole 34 and two subsidiary holes 35 are at a same horizontal surface. The position of the main hole 34 corresponds to the speaker 20 and is configured for allowing sound generated from the speaker 20 of the body 10 to pass through to outside of the body 10. The position of the subsidiary holes 35 corresponds to that of the grooves 14 of the body 10. In this embodiment, the main hole 34 includes four arc through holes. The arc through holes are spaced to each other, and are located at a same circumference so that the arc through holes surround above the speaker. The subsidiary holes 35 are defined at two sides of the main hole 34. When the housing 30 is assembled with the body 10, a main sound channel is formed between the recess 13 and the housing 30. A subsidiary sound channel is formed between the groove 14 and the housing 30. The main section 32 defines two side holes 385 at two sides thereof. The position of the side holes 385 is not at the same horizontal plane so that sound may be effectively transmitted along different directions of the housing 30.

In assembly, the arcuate portion 33 of the housing 30 faces the end portion 12 of the body 10, and the housing 30 is pressed downward to engage with the body 10. When the portable electronic device is used, the subsidiary holes 35 and the side hole 385 may effectively help to transmit the sound from the speaker 20 to the outside of the portable electronic device. This structure may effectively improve the sound effect and quality.

The above-described housing can be used with other kinds of electronic devices besides the mobile phone 100 illustrated, or with other kinds of apparatuses that need a hole configured for broadcasting sound.

It is believed that the present embodiment and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A portable electronic device comprising:
   a body defining a recess and two grooves, the grooves disposed on opposite sides of the recess;
   a speaker being received in the recess; and
   a housing including a main section, the main section defining a main hole and two subsidiary holes, the main hole comprising four arcuate through holes lying along a same circular circumference and surrounding the speaker, the housing engaging with the body, the main hole aligning with the speaker, and the grooves aligning with the subsidiary holes, the main hole and the subsidiary holes transmitting the sound from the speaker to outside of the portable electronic device.

2. The portable electronic device as claimed in claim 1, wherein the subsidiary holes are disposed between two sides of the main hole.

3. The portable electronic device as claimed in claim 1, wherein the recess and the housing defines a main sound channel, the groove and the housing define a subsidiary sound channel, the main sound channel and the subsidiary sound channel transmit the sound from the speaker to outside of the portable electronic device.

\* \* \* \* \*